(12) United States Patent
Vogelsang et al.

(10) Patent No.: US 12,499,966 B2
(45) Date of Patent: Dec. 16, 2025

(54) DYNAMIC, RANDOM-ACCESS MEMORY WITH HIDDEN MEMORY SCRUBBING

(71) Applicant: Rambus Inc., San Jose, CA (US)

(72) Inventors: Thomas Vogelsang, Mountain View, CA (US); Torsten Partsch, San Jose, CA (US)

(73) Assignee: Rambus Inc., San Jose, CA (US)

( * ) Notice: Subject to any disclaimer, the term of this patent is extended or adjusted under 35 U.S.C. 154(b) by 168 days.

(21) Appl. No.: 18/474,643

(22) Filed: Sep. 26, 2023

(65) Prior Publication Data

US 2024/0127903 A1  Apr. 18, 2024

Related U.S. Application Data

(60) Provisional application No. 63/415,930, filed on Oct. 13, 2022.

(51) Int. Cl.
*G11C 29/00* (2006.01)
*G11C 11/4091* (2006.01)
(Continued)

(52) U.S. Cl.
CPC .......... *G11C 29/52* (2013.01); *G11C 11/4091* (2013.01); *G11C 11/4096* (2013.01)

(58) Field of Classification Search
CPC .. G06F 11/106; G06F 11/1068; G06F 3/0619; G06F 3/064; G06F 3/0688; G06F 3/0659; G06F 3/0655; G06F 3/0673; G06F 11/0772; G06F 11/1016; G06F 11/1044; G06F 11/1076; G06F 11/076; G06F 11/10; G06F 11/1048; G06F 11/1052; G06F 11/3037; G06F 12/0882; G06F 13/1668; G06F 13/1673; G11C 11/4093; G11C 2029/0409; G11C 2029/0411; G11C 2211/4062; G11C 11/40615;
(Continued)

(56) References Cited

U.S. PATENT DOCUMENTS 6,201,729 B1   3/2001   Rivers
6,360,294 B1   3/2002   Ferrant et al.
(Continued)

OTHER PUBLICATIONS

Jacob et al. "DRAM: Architectures, Interfaces, and Systems: A Tutorial," International Society for Computers and their Applications (ISCA) 2002 (146 pages).
(Continued)

*Primary Examiner* — Thong Q Le
(74) *Attorney, Agent, or Firm* — Silicon Edge Law Group LLP; Arthur J. Behiel (57) ABSTRACT

A memory includes a local control circuitry that manages scrub transactions using a set of sense amplifiers separate from those used for access (read and write) transactions. The local control circuitry interrupts scrub transactions to prioritize access requests, thereby offering improved memory performance. The local control circuitry also divides scrub transactions into phases and periods based on whether the scrub transaction requires access to bitlines used for read and write access. This division allows the local control circuitry to interleave and interrupt scrub transactions with access transactions in a manner that minimizes access interference.

20 Claims, 9 Drawing Sheets

(51) Int. Cl.
*G11C 11/4096* (2006.01)
*G11C 29/52* (2006.01)

(58) Field of Classification Search
CPC ............ G11C 11/4082; G11C 11/4087; G11C
2029/4402; G11C 29/04; G11C 7/02;
G11C 11/406; G11C 11/4091; G11C
11/408; G11C 29/42; G11C 7/06; G11C
7/10; G11C 8/06; G11C 29/44; G11C
11/40607; G11C 11/40618; G11C
16/0483; G11C 29/02; G11C 29/028;
G11C 29/52; G11C 11/4076; G11C
11/4096; G11C 11/5628; G11C 11/5635;
G11C 11/5642; G11C 16/0416; G11C
16/0466; G11C 16/0491; G11C 16/10;
G11C 16/3431; G11C 29/4401; G11C
7/1042; G11C 7/18; G11C 8/08
See application file for complete search history.

(56) References Cited

U.S. PATENT DOCUMENTS

| | | | |
|---|---|---|---|
| 6,826,106 B2 | 11/2004 | Chen | |
| 7,002,864 B2 | 2/2006 | Kim et al. | |
| 7,009,902 B2 | 3/2006 | Dortu | |
| 7,035,133 B2 | 4/2006 | Kim et al. | |
| 7,093,067 B2 | 8/2006 | Sunaga et al. | |
| 7,275,130 B2 | 9/2007 | Klein | |
| 8,331,184 B2 | 12/2012 | Wang | |
| 8,402,326 B2 | 3/2013 | Singh | |
| 9,411,678 B1 | 8/2016 | Ware et al. | |
| 9,761,297 B1 | 9/2017 | Tomishima | |
| 9,823,964 B2 * | 11/2017 | Reed | G06F 3/0688 |
| 9,880,900 B2 | 1/2018 | Reed et al. | |
| 10,872,011 B2 | 12/2020 | Bains et al. | |
| 11,048,583 B1 | 6/2021 | Hokenmaier et al. | |

OTHER PUBLICATIONS

Patel et al., "Understanding and Modeling On-Die Error Correction in Modern DRAM: An Experimental Study Using Real Devices," 2019 49th Annual IEEE/IFIP International Conference on Dependable Systems and Networks (DSN), Portland, OR, USA, 2019, pp. 13-25, doi: 10.1109/DSN.2019.00017 (13 pages).

Wikipedia, "Memory scrubbing," Retrieved from "https://en.wikipedia.org/w/index.phptitle=Memory_scrubbingoldid=940164434", last edited on Feb. 10, 2020, at 22:33 (UTC), (2 pages).

* cited by examiner

DYNAMIC, RANDOM-ACCESS MEMORY WITH HIDDEN MEMORY SCRUBBING

BACKGROUND

Dynamic, random-access memories (DRAMs) have memory cells, each of which stores a bit of data as a quantity of electrical charge that can be sensed as a relatively high or low voltage. DRAM cells are so small, and the stored charge so minute, that stored values can be changed by cosmic rays or alpha-particle emissions. Radioactive contaminants in circuit packaging and cosmic radiation are common sources of these particles. Also, operations targeting neighboring DRAM cells can affect (disturb) the DRAM cells and eventually change the stored value. The resulting so-called "soft errors" do not damage the memory device but do interfere with computation and should be minimized or corrected.

BRIEF DESCRIPTION OF THE DRAWINGS

The present disclosure is illustrated by way of example, and not by way of limitation, in the figures of the accompanying drawings and in which like references refer to similar elements and in which:

FIG. 5 schematically represents a portion of DRAM 110 of FIG. 1 in accordance with one embodiment, like-identified elements being the same or similar.

DETAILED DESCRIPTION

A memory system includes a host controller that issues access requests to a dynamic, random-access memory (DRAM) and a local circuit that "scrubs" the DRAM to correct for soft errors that may otherwise accumulate. Access requests from the host controller initiate access transactions to write to and read from the DRAM. Access requests from the host controller include precharge to ready a bank of memory cells, activate to open a row of memory cells in a bank, read requests to initiate the reading of data from an open row, and write requests that initiate the writing of data to an open row. The local control circuit initiates scrub transactions asynchronously with respect to access requests from the host controller. Scrub transactions read stored bit sequences, correct soft errors, and write back the corrected bit sequences. The local control circuit divides scrub transactions into phases and periods that can be interleaved with and interrupted by access transactions to minimize access interference, and thereby offer improved memory performance. Separate sense amplifiers for access and scrub transactions facilitate overlapping access and sense transactions.

Figure 1A:
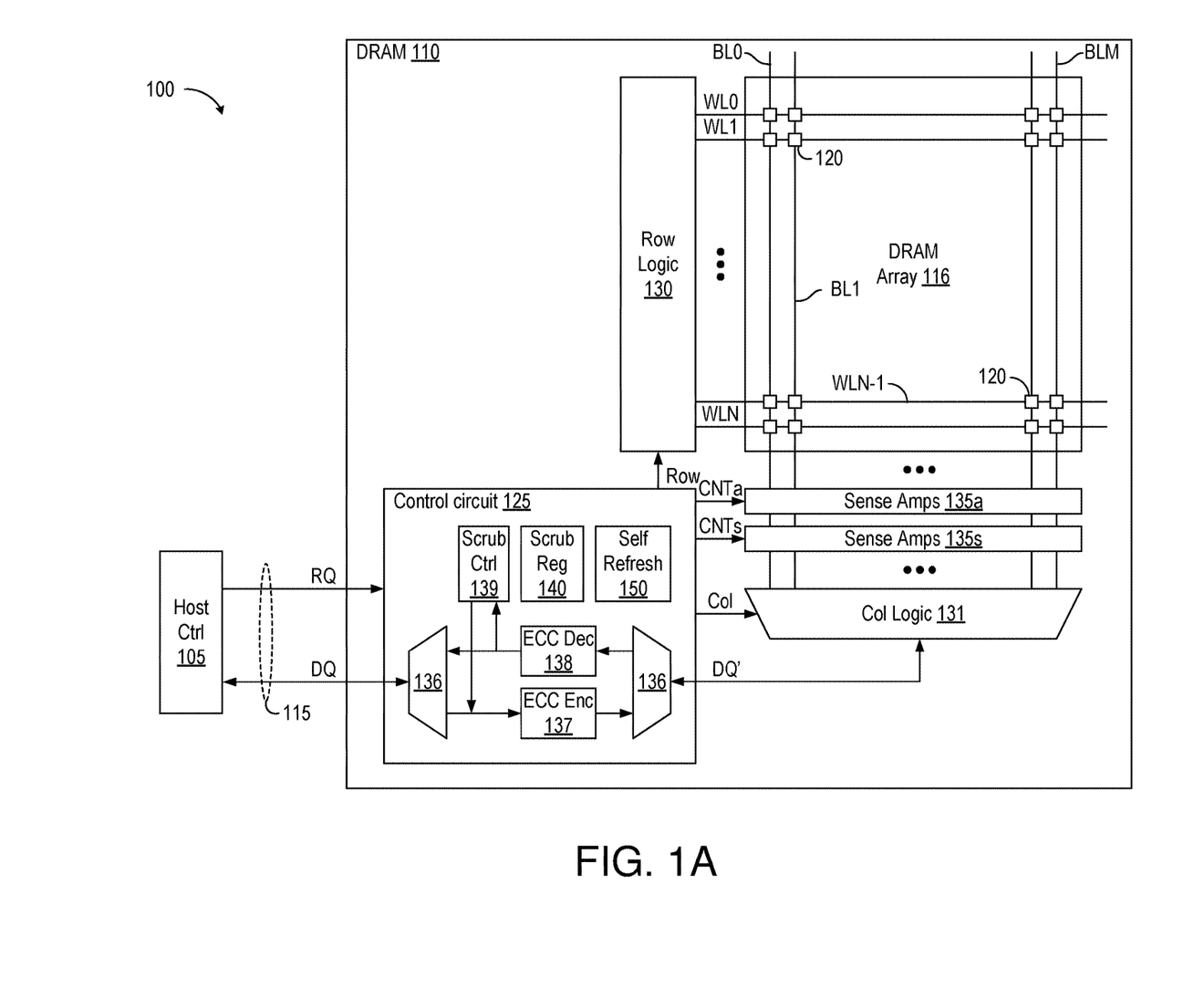
FIG. 1A depicts a memory system 100 in which a host controller 105 provides access to a DRAM 110, a memory device, via a communication channel 115 that communicates access requests RQ and data DQ.

FIG. 1A depicts a memory system 100 in which a host controller 105 provides access to a DRAM 110, a memory device, via a communication channel 115 that communicates access requests (e.g. precharge, activate, read, and write requests with accompanying addresses) RQ and data DQ. DRAM 110 includes a memory-array tile (MAT), an array 116 with rows and columns of memory cells 120 represented as squares at the intersections of wordlines WL[N:0] and bitlines BL[M:0]. Local control circuit 125 responds to write requests RQ from host controller 105 by error encoding data DQ to encoded data DQ' and controlling row logic 130, column logic 131, and access sense amplifiers 135a to write encoded data DQ' to array 116. Local control circuit 125 responds to read requests by sensing a row of error-encoded data using sense amplifiers 135a, reading a column of the encoded data DQ' from sense amplifiers 135a, decoding encoded data DQ' to recover data DQ, and conveying decoded data DQ to host controller 105. Local control circuit 125 can also autonomously scrub array 116. As detailed below, a second array of sense amplifiers 135s supports array scrubbing while minimizing interference with host transactions. Local control circuit 125 manages array scrubbing as a background process that has little or no impact on DRAM input/output bandwidth.

In support of on-die error-correction, local control circuit 125 includes data-steering logic 136, represented as a pair of multiplexer/demultiplexer circuits, that conveys write data though an encoder 137 and read data through an error-correction circuit, ECC decoder 138. Encoder 137 encodes data DQ with an encoding algorithm that provides at least one bit of error tolerance, which is to say that data DQ can be reliably recovered (decoded) from encoded data DQ' provided no more than one bit error appears in data DQ'. Error-encoded write data DQ' is conveyed to and from array 116 via column logic 131 and sense amplifiers 135a. To prevent soft errors from accumulating, scrub control circuit 139 steps through each address in array 116 to read, decode, encode, and write back the stored data. A scrub register 140 stores values that determine the rate at which scrub transactions are initiated. Sense amplifiers 135s are used in lieu of sense amplifiers 135a in some embodiments to reduce interference with host transactions.

Local control circuit 125 also includes self-refresh control circuit 150 that initiates refresh transactions asynchronously with respect to access requests from host controller 105. In some embodiments self-refresh control circuit 150 works with scrub control circuit 139 to share the use of sense amplifiers 135s so that both scrub and refresh transactions are interleaved with and interrupted by access transactions to minimize access interference. Refresh transactions are more frequent than and take precedence over scrub transactions.

Figure 1B:
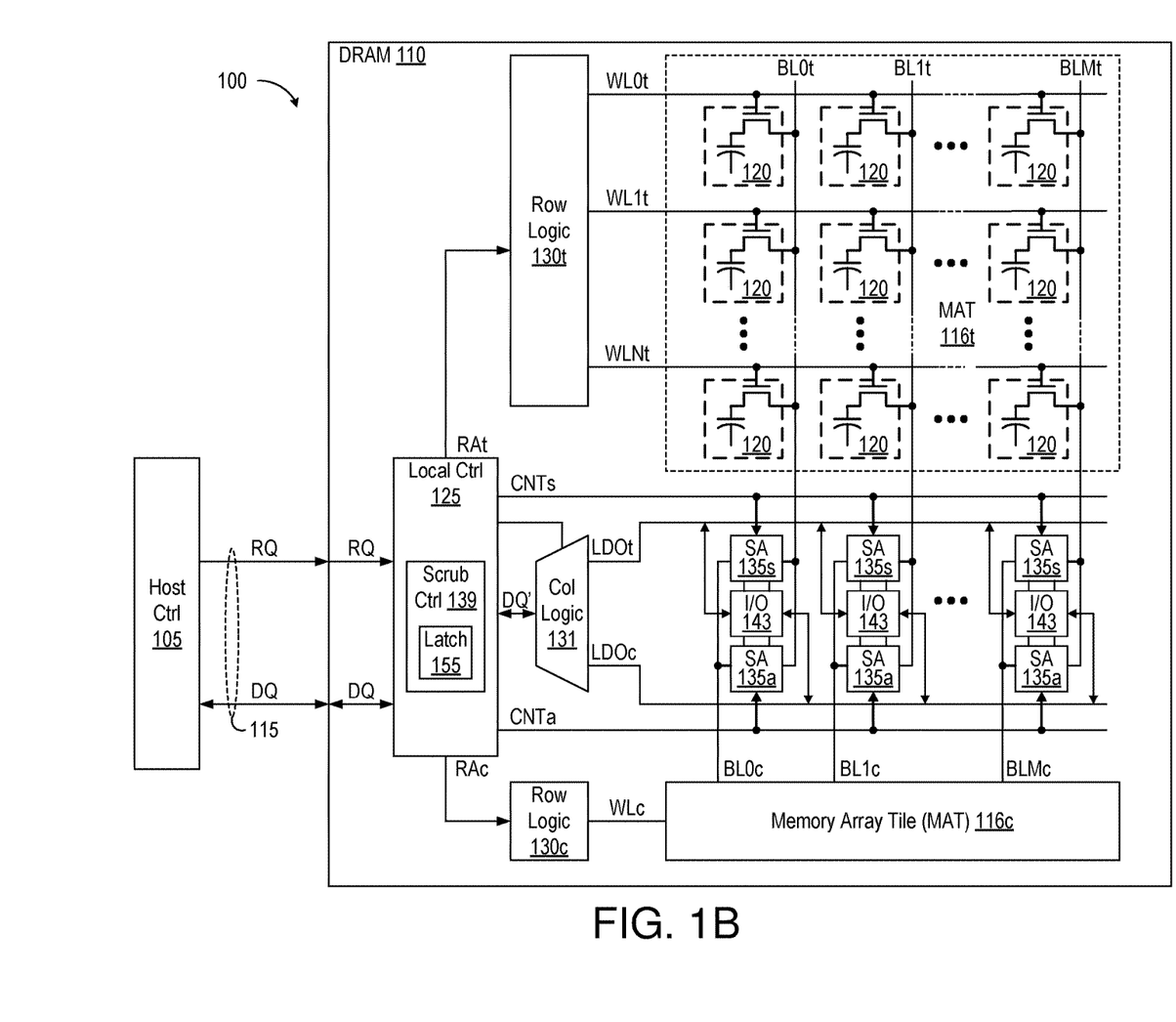
FIG. 1B depicts memory system 100 introduced in FIG. 1A but highlighting different aspects to illustrate the roles of access sense amplifiers 135a, scrub sense amplifiers 135s, and input/output (I/O) circuits 143.

FIG. 1B depicts memory system 100 introduced in FIG. 1A but highlighting different aspects to illustrate the roles of access sense amplifiers 135a, scrub sense amplifiers 135s, and input/output (I/O) circuits 143. Each bitline is coupled to a pair of sense amplifiers 135a/s. I/O circuits 143 communicate data between the sense amplifiers and column logic 131 via complementary signals LDOt and LDOc on like-named signal paths. Local control circuit 125 services access requests using access sense amplifiers 135a (the "a" for "access") and scrub requests using a separate set of scrub sense amplifiers 135s (the "s" for "scrub"). Local control circuit 125 includes latches 155 that store one column of bits to be acted upon by ECC encoder 137 and ECC decoder 138. As part of a scrub transaction, control circuit 125 reads a potentially erroneous of bit pattern from a column of sense amplifiers 135s into latches 155; uses ECC decoder 138 to correct a bit error, if any, in the latched bit pattern; uses ECC encoder 137 to reencode the column bits and overwrite latched 155 with the error-free bit pattern; and writes the contents of latch 155 back to the column of sense amplifiers 135s.

Host controller 105 and DRAM device 110 are integrated-circuit (IC) devices, commonly referred to as "chips" or "dies." Host controller 105 can be a separate, standalone chip, or integrated into another chip. For example, a memory controller may be included on a single die with a microprocessor or included as part of a more complex system such as a system on a chip (SOC). DRAM 110 includes banks/sub-banks of memory-array tiles (MATs) 116, though only two are shown for ease of illustration. Other elements unnecessary for understanding the operation of system 100 are likewise omitted. The upper and lower MATS are respectively labeled 116t and 116c, the "t" and "c" for "true" and "complement." A cell or array is not permanently true or complement; rather, a "true" cell or array is one being read from or written to and a complement an identical element that serves as a reference. The true and complement roles are detailed below.

Figure 2:
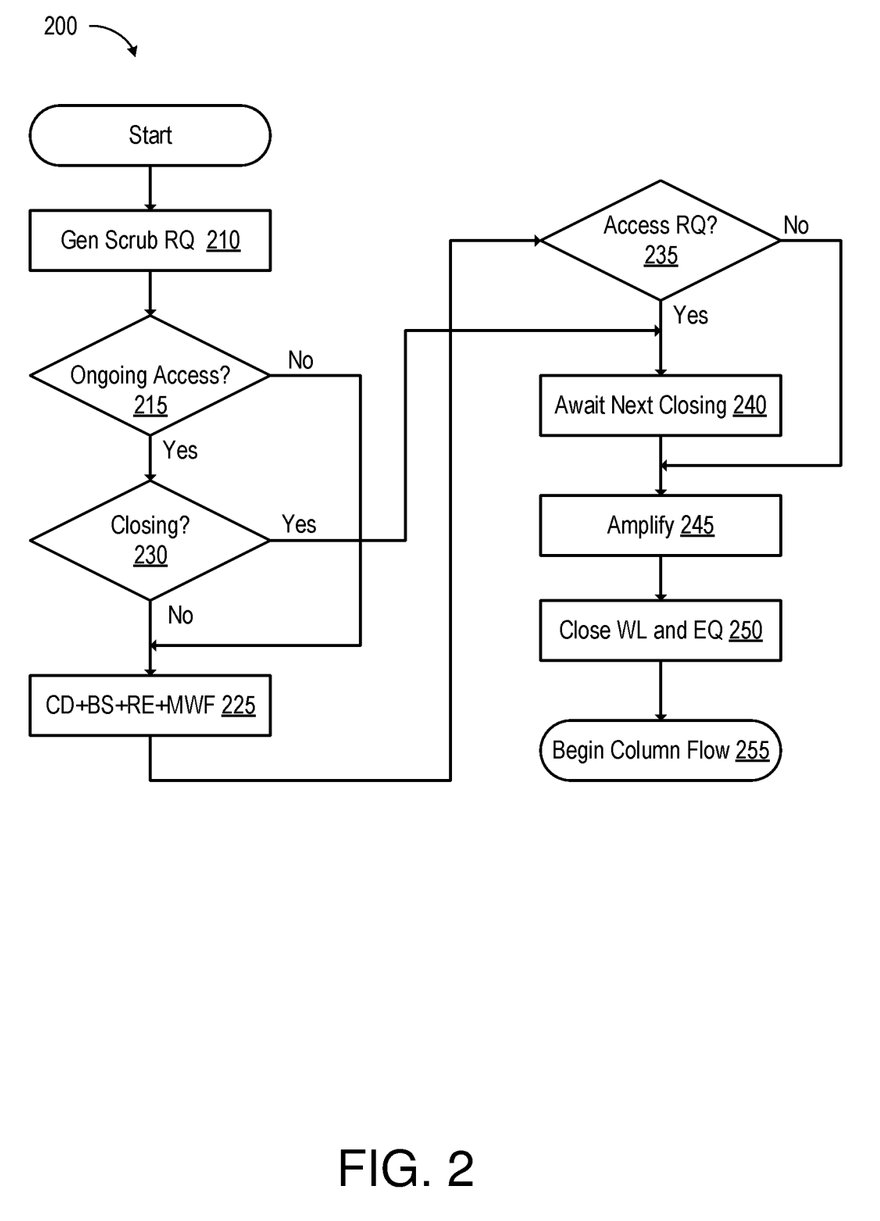
FIG. 2 is a flowchart 200 illustrating how the contents of a row of memory cells 120 in array 116t is sensed and stored in sense amplifiers 135s without interfering with access transactions directed to the same array.

FIG. 2 is a flowchart 200 illustrating how the contents of a row of memory cells 120 in array 116t is sensed and stored in sense amplifiers 135s without interfering with access transactions directed to the same array. Scrub control circuit 139, as triggered by an internal timer, periodically issues a scrub request (210) to initiate a scrub transaction to a row of memory cells 120, the row address taken from a scrub counter within or accessible by scrub control circuit 139. Host controller 105 can write a scrub-rate value to scrub register 140 that sets the periodicity of scrub transactions based e.g. on a desired balance between error tolerance and power consumption.

Per decision 215, if there is no ongoing access transaction using the bitlines required by the scrub request, local control circuit 125 evaluates the scrub request and asserts the wordline of the addressed row (225). These actions include command decode CD, bank select BS, redundancy evaluation RE, and master-wordline falling MWF. If there is an ongoing access, decision 215 moves to decision 230, which awaits the closing of the open wordline of the ongoing access so as not to interfere with service to host controller 105. Command decode is here used to distinguish the scrub requests from other internal requests, such as memory refresh. Refresh transactions are well known so a detailed treatment is omitted.

Pre decision 235, if local control circuit 125 receives an access request from host controller 105 at any time up until completion of 225, scrub control circuit 139 saves the state of the ongoing scrub transaction, services the access request, and awaits the next closing (step 240). When that request closes, local control circuit 125 selects the wordline of the pending scrub request and engages sense amplifiers 135s to sense and amplify the selected row of memory cells 120 (step 245). The open wordline is then closed and the bitlines equalized (step 250) in preparation for the next access. Scrub control circuit 139 then begins a sequence of column operations (step 255) that correct any errors stored in sense amplifiers 135s. Each column operations manipulates a subset of a row of bits, e.g. a bank with 1,024-bit rows can be divided into sixteen, separately addressable 64-bit columns.

Figure 3:
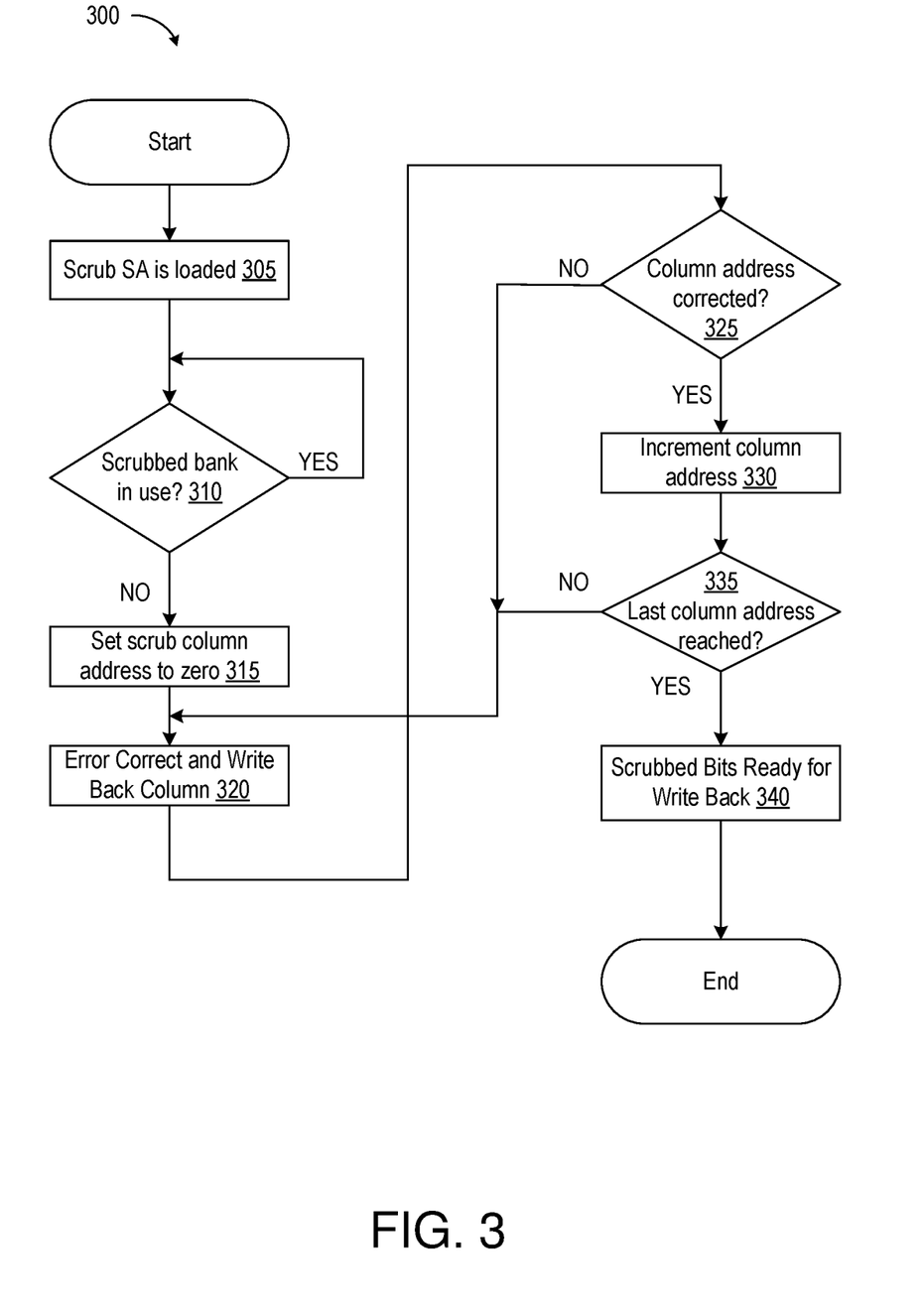
FIG. 3 is a flowchart 300 illustrating a process for reading, scrubbing (decoding and re-encoding), and overwriting columns of bits stored in sense amplifiers 135s.

FIG. 3 is a flowchart 300 illustrating column operations for reading, scrubbing (decoding and re-encoding), and overwriting columns of bits stored in sense amplifiers 135s. Sense amplifiers 135s are assumed to be loaded (step 305) with potentially erroneous bit patterns using e.g. the process illustrated in FIG. 2. If the bank containing the scrubbed row is in use, the scrubbing process is interrupted until the bank is available (decision 310). When the bank is available, scrub control circuit 139 sets a column-address value Col to zero (step 315), reads the potentially erroneous bit pattern from the addressed column of sense amplifiers 135s, and employs decoder 138 to correct the bit pattern if need be. Scrub control circuit then employs encoder 137 to reencode the bit pattern and write the resulting encoded, error-free bit pattern back to the subset of amplifiers 135s and thus to the column from whence they came (step 320). Local control circuit 125 monitors for incoming access requests during this time, interrupted the scrub transaction if needed to prioritize a host access.

Per decision 325, once the addressed column is scrubbed, the column address is incremented (step 330). Per decision 335, if the column address exceeds the final column address, then scrub control circuit 139 notes the completion of the scrubbed row and prepares to write the bits in sense amplifiers 135s back to the row being scrubbed (step 340). This ends the column operations associated with a selected row.

Figure 4:
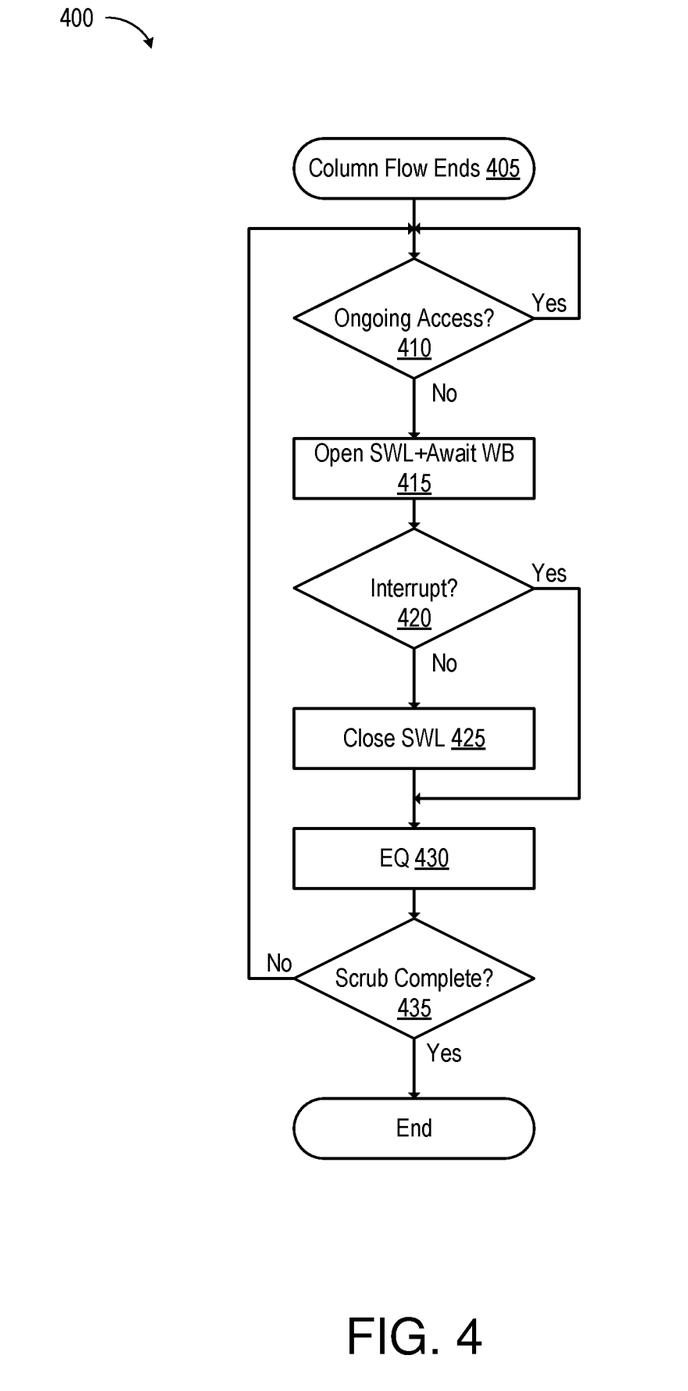
FIG. 4 is a flowchart 400 illustrating how a scrubbed row of data is moved from sense amplifiers 135s back to the row of memory cells 120 addressed by the scrub transaction.

FIG. 4 is a flowchart 400 illustrating how a scrubbed row of data is moved from sense amplifiers 135s back to the row of memory cells 120 addressed by the scrub transaction. The process begins when the column flow ends (405), such as when the process of FIG. 3 completes. Per decision 410, the process stalls if there is an ongoing access to the bank that is the target of the scrub transaction. Absent or upon completion of an access, local control circuit 125 opens the wordline of the target row and awaits a write-back time required to charge the memory cells to values reflecting the scrubbed bits (step 415). The process can be interrupted during step 415 by a regular access and before the write-back is complete. If not, per decision 420, the scrubbed wordline is closed (step 425) and the bitlines equalized (step 430) in preparation for the next transaction. If step 415 is interrupted, however, the bitlines are immediately equalized and the interrupting access transaction proceeds. No data is lost because the scrubbed data remains in sense amplifiers 135s. Per decision 435, incomplete transactions are retried when the bank is available. Eventually, the scrubbed data is restored to the open row and the row is closed, marking completion of the scrub transaction. Scrub control circuit 139 increments to the next row address.

Refresh transactions can follow flowcharts 200 and 400, omitting the column flow of flowchart 300. A first phase of a refresh transaction senses and stores in sense amplifiers 135s a row of bit values in the manner of a scrub transaction but to a row-address specified by a refresh counter within or accessible by self-refresh controller 150. A second phase restores the values to the row. As with scrub transactions, periods of bitline usage are time-shifted and interleaved with access transactions that require the same bitline to read or write data so as not to interfere with access. Access transactions interrupt the second phase, leaving the local control circuitry to attempt cell restoration later when the access transaction or transactions is complete.

Figure 5:
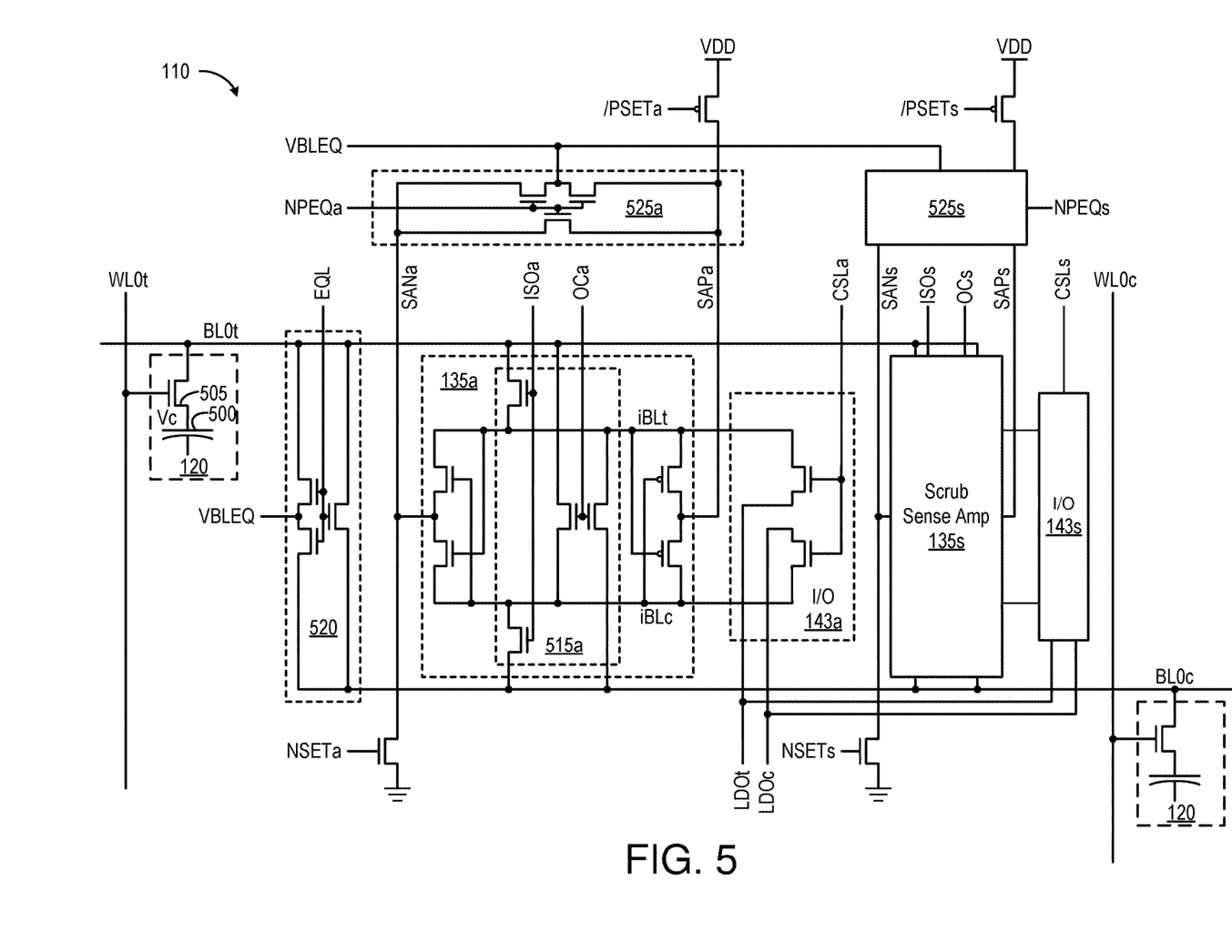

FIG. 5 schematically represents a portion of DRAM 110 of FIG. 1 in accordance with one embodiment, like-identified elements being the same or similar. Access sense amplifier 135a and refresh sense amplifier 135s are identical in this example and both are selectively coupled between complementary bitlines BL0t and BL0c. Each sense amplifier detects and amplifies voltage differences between bitlines BL0t and BL0c when one of wordlines WL0t and WL0c is asserted to discharge a capacitor 500 through a transistor 505 and onto the respective bitline, the other bitline serving as a reference. In this example, bitline BL0t is used to read the contents of the leftmost memory cell 120 against reference bitline BL0c. I/O circuit 143 of FIG. 1B has two parts, an I/O circuit 143a that communicates data on lines LD0t/c to and from access sense amplifier 135a and an I/O circuit 143s that does the same for scrub sense amplifier 135s.

Access sense amplifier 135a includes a pair of cross-coupled inverters that is switched on by an evaluate control block 515a. The cross-coupled inverters comprise n-channel field effect transistors (NFETs) on the left and p-channel field effect transistors (PFETs) on the right. The uppermost NFET/PFET pair forms a first inverter that is cross-coupled to a second inverter formed using the lowermost pair. A negative supply voltage SANa and a positive supply voltage SAPa to the inverters are selectively provided when local control circuit 125 asserts respective control signals NSETa and/PSETa, both of which are part of the control port labeled CNTa in FIG. 1B. Signals NSETa and/PSETa are deasserted and signal EQL asserted to allow a bitline-equalization block 520 to equalize the voltage levels on bitlines BLt and BLc between sense operations. A power-supply equalization block 525a likewise equalizes supply lines SANa and SAPa to a common intermediate voltage VBLEQ between sense operations. I/O circuit 143a allows local control circuit 125, by asserting control signal CSLa, to move complementary data signals LD0t/LD0c to and from bitlines BLt/BLc during a write and read access, respectively. Each control node and signal to access sense amplifier 135a is designated with a trailing "a" for "access." Control nodes and signals to scrub sense amplifier 135s are similarly designated with a trailing "s" for "scrub." Signals with a leading "l" are active low, meaning that they are asserted/deasserted as a relatively low/high voltage.

In access sense amplifier 135a, evaluate control block 515a receives an offset cancellation signal OCa and an isolation signal ISOa from local control circuit 125. The term "offset" refers to characteristic differences between the components of access sense amplifier 135a that can imbalance the amplifier and thus produce sense errors. Asserting signal OCa connects internal bitline nodes iBLt and iBLc to external bitlines BL0c and BL0t, the opposite connectivity employed when isolation signal ISOa is asserted to sense the voltage difference between bitlines BL0t and BL0c. Asserting signal OCa briefly senses the characteristic offset to impose a corresponding voltage offset between bitlines BL0t and BL0c that counteracts the effect of the characteristic offset when signal ISOa is asserted. Deasserting both the OCa and ISOa signals disconnects access sense amplifier 135a from the bitlines BL0t and BL0c. Scrub sense amplifier 135s is similarly controlled to sense and amplify the voltage difference between bitlines BL0t and BL0c for scrub transactions. A power-supply equalization block 525s equalizes supply lines SANs and SAPs to intermediate voltage VBLEQ between scrub-transaction sense operations.

Some embodiments omit I/O circuit 143s; instead, an activate command ACT opens or maintains open the wordline and local control circuit 125 copies the data from scrub sense amplifier 135s to access sense amplifier 135a over bitlines BL0t and BL0c before reading from or writing to sense amplifier 135a. To copy between the sense amplifiers, signals both isolation signals ISOa and ISOr are asserted simultaneously while signals NSETa and/PSETa are deasserted. Scrub sense amplifier 135s drives bitlines BL0t and BL0c apart to produce a voltage difference across internal bitlines iBLt and iBLc of access sense amplifier 135a. Signals NSETa and/PSETa are asserted after a short delay to drive internal bitlines iBLt and iBLc of access sense amplifier 135a to the value on the same nodes of scrub sense amplifier 135s. Thereafter, the access proceeds from access sense amplifier 135a as noted previously.

Figure 6:
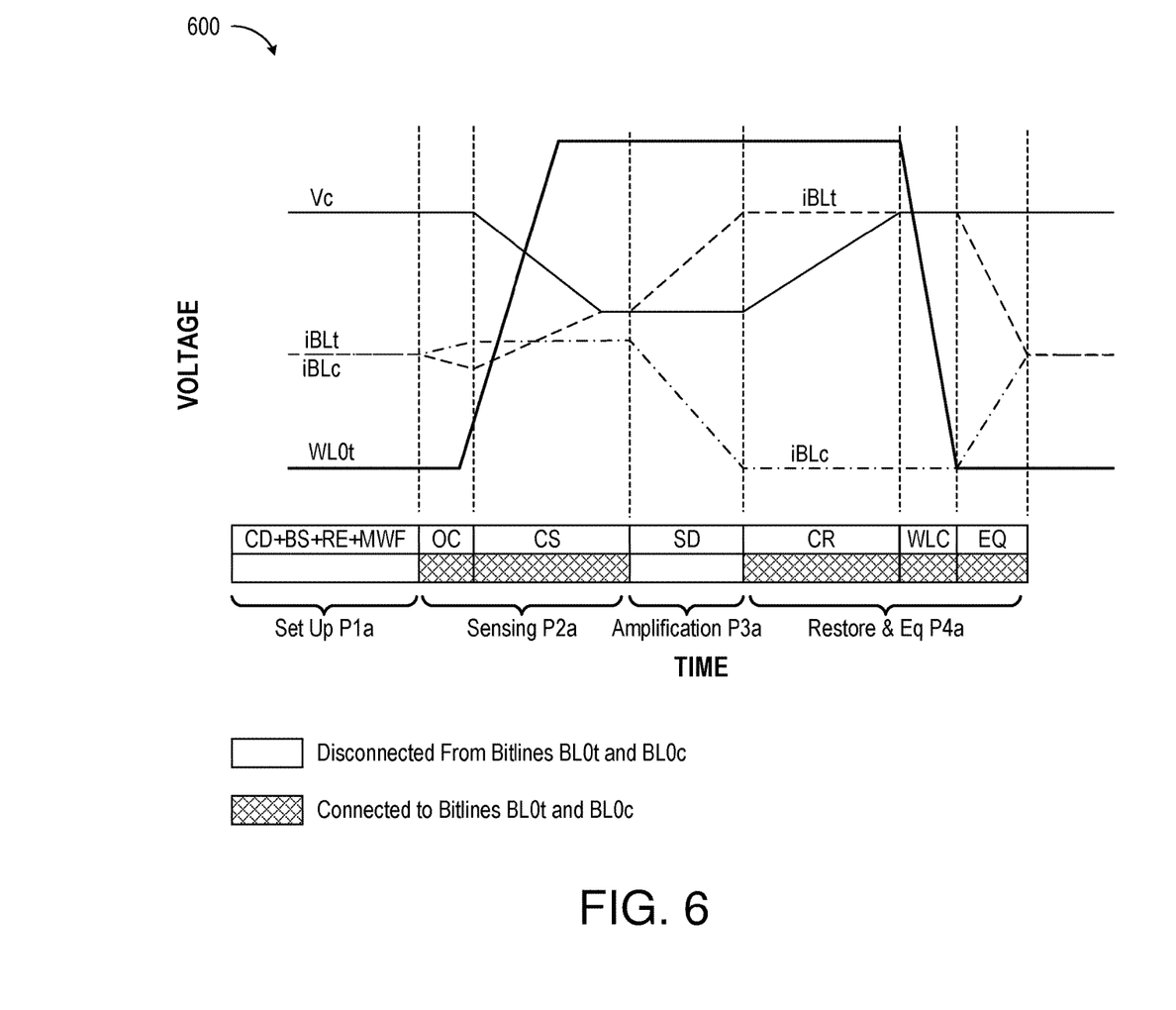
FIG. 6 is a waveform diagram 600 illustrating voltage levels for a read-access transaction using access sense amplifier 135a using signal designations that correspond to nodes of FIG. 5.

FIG. 6 is a waveform diagram 600 illustrating voltage levels for a read-access transaction using access sense amplifier 135a using signal designations that correspond to nodes of FIG. 5. Signal Vc refers to a memory-cell voltage across capacitor 500 that represents a stored binary value; signals iBLt and iBLc represent voltage levels on complementary input nodes of amplifier 135a that can be isolated from bitlines BL0t and BL0c via control block 515, and signal WL0t represents the wordline voltage that is raised (asserted) to enable transistor 505 in the memory cell 120 at left in FIG. 5 to share the charge stored on the corresponding capacitor 500 with bitline BL0t. Voltage Vc across capacitor 500 is proportional to the stored charge. When capacitor 500 is connected to the bitline BL0t, the resultant charge sharing changes the bitline voltage by a small amount in comparison with the initial stored voltage. Access sense amplifier 135a senses and amplifies the bitline voltage to recover the stored bit.

Labels along the time axis summarize various periods P1a, P2a, P3a, and P4a of the read-access transaction. With reference to memory system 100 of FIG. 1, host controller 105 initiates the transaction by issuing a read request, or read command, to local control circuit 125, which responsively directs control signals CNTRa to manage the transaction in the manner depicted in FIG. 4. Local control circuit 125 decodes the command (CD=command decode) to determine the type and address of the access. The address allows local control circuit 125 to select the bank of memory cells (BS=bank select) and perform a redundancy evaluation RE by which local control circuit 125 can map requests from defective memory resources to redundant resources provided for that purpose. Local control circuit 125 then issues a signal main-wordline falling MWF (not shown) that initiates the assertion of wordline signal WL0t to read the selected memory cell 120. This set-up period P1a, collectively termed an access-request evaluation period, produces an evaluated access request and does not require bitline access.

Before wordline signal WL0t is asserted, sense amplifier 135a is powered on by the assertion of signals/PSETa and NSETa and offset-compensation signal OCa is asserted, driving the voltages on interior bitline nodes iBLt and iBLc apart to a degree determined by an imbalance inherent to sense amplifier 135a./PSETa, NSETa, and OCa are then deasserted. Wordline signal WL0 is then asserted to initiate charge-sharing CS in which capacitor 500 discharges onto bitline BL0t, causing voltage Vc to fall and the voltage on bitline BL0t to rise. Though not shown, signal ISOa is also asserted so the voltages on bitlines BL0t and BL0c are conveyed to nodes iBLt and iBLc for sensing. Next, in signal development SD, isolation signal ISO is deasserted to isolate amplifier 135a from bitlines BL0t and BL0c. The OC and CS operations, collectively a sensing period P2a, require bitline access. Amplifier 135a then amplifies the relatively small voltage disparity between nodes iBLt and iBLc during an amplification period P3a that does not require bitline access. While not shown, local control circuit 125 can read the data via I/O circuit 143a.

Charge restoration (CR) is performed with wordline signal WL0t and signal ISOa asserted so amplifier 135a charges capacitor 500 to the restored level. Once restored, the wordline closes (WLC) and equalization blocks 520 and 525a are used to equalize (EQ) the bitlines and the supply nodes of amplifier 135a in preparation for the next access. The CR, WLC, and EQ processes collectively occur over a period P4a that requires bitline access. Periods P1a and P3a are exploited for scrub transactions that require access to the same bitlines. Were this a write transaction, the sensing and amplification periods would be omitted, and a new bit would be presented across the bitlines via I/O circuit 143a to be stored in the target memory cell.

Figure 7:
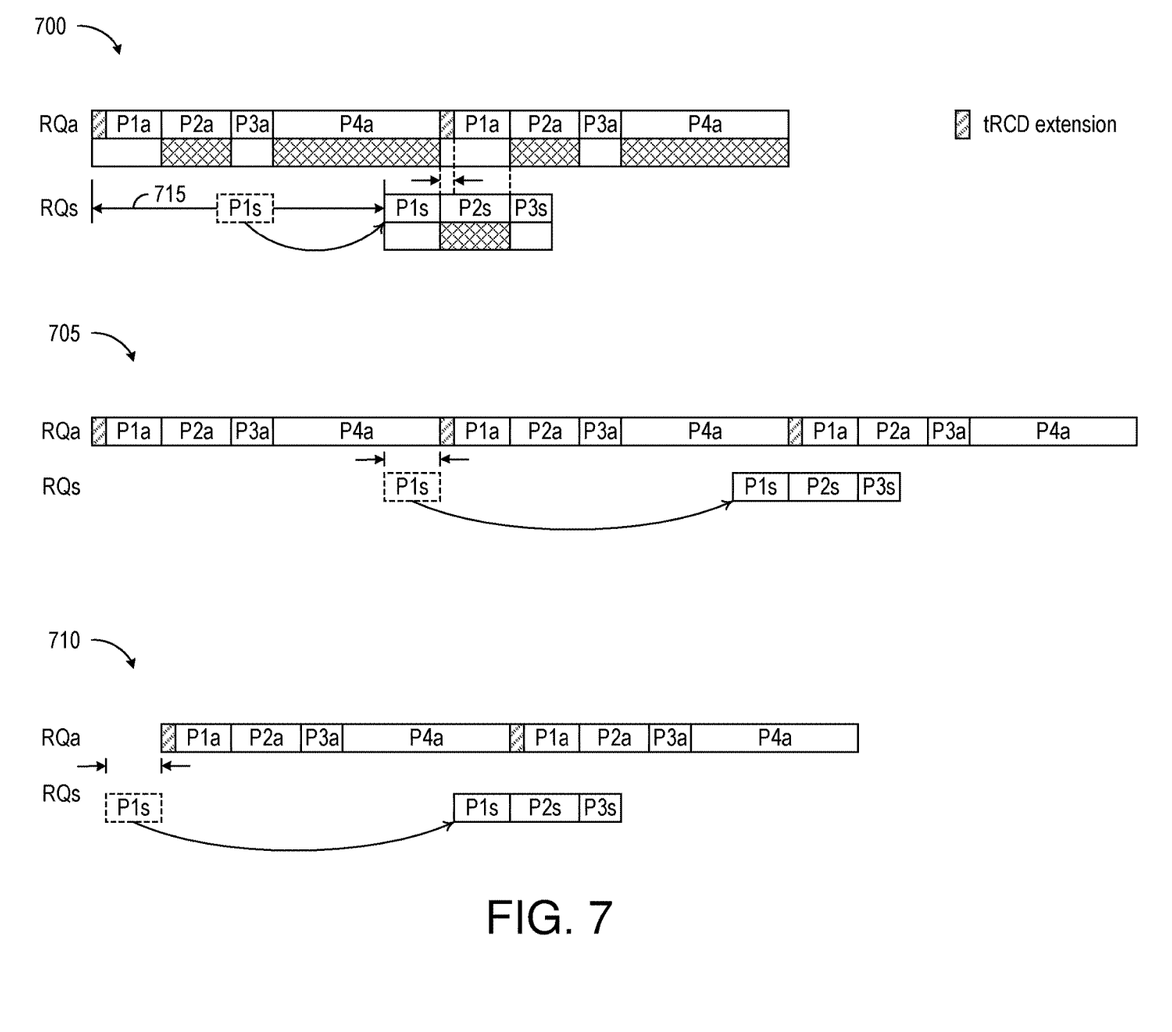
FIG. 7 depicts three timing diagrams 700, 705, and 710 illustrating how the read phase of a scrub transaction schedules bitline usage to periods in which they are not required for access (e.g. read and write) transactions.

FIG. 7 depicts three timing diagrams 700, 705, and 710 illustrating how the read phase of a scrub transaction schedules bitline usage to periods in which they are not required for access (e.g. read and write) transactions. This timing allows scrub transactions to be hidden from host controller 105. The protocol implemented by host controller 105 may require periodic bank-specific pauses to ensure all open scrub and refresh transactions have time to complete.

Access and scrub requests are designated RQa and RQs, respectively. An access request RQa is illustrated as occurring over four periods P1a, P2a, P3a, and P4a divided as illustrated in FIG. 6 by whether they require interaction with bitlines BL0t and BL0c. A scrub request RQs, the first phase in which a row is sensed, is illustrated as occurring over three periods P1s, P2s, and P3s that are likewise divided by bitline usage.

Scrub requests RQs are locally issued asynchronous to remotely source access requests RQa. Any scrub request RQs initiated within interval 715—during an access request but before the access request is closing—is aligned with the access request RQa such that scrub-request evaluation period P1s completes as the bitlines become available for scrub-sense period P2s. Scrub-request evaluation period P1s produces an evaluated scrub request without bitline access.

Access-request evaluation period P1a, during which access commands are decoded, is not as long as scrub-request sense period P2s in this example. Evaluation period P1a is extended by a small amount so local control circuit 125 can time scrub sense period P2s to access bitlines BL0t and BL0c while they are not servicing the access transaction. The time extension is labeled a "tRCD extension" because the datasheet parameter affected by the time extension is the row-column delay time tRCD, which is a function of the time between the access request and the accessed data being available in the access sense amplifier.

Scrub phase 1, the capture of a wordline into sense amplifiers 135s, is completed after two consecutive regular accesses at the latest. The time required to equalize the bitlines before a regular access in phase 1 is short because it occurs directly after charge sharing, a time during which the bitline voltages are relatively close together. For access transactions, a fast decoding of the bank address and a fast generation of a bank-select signal, illustrated here as period P1a of access request RQa, enables rapid interruption of scrub transactions.

Diagram 705 is similar to diagram 700 but the scrub transaction is further delayed because the scrub request arrived too late in the access transaction to complete set-up period Plr before the bitlines are relinquished by the access transaction. In diagram 710, scrub request RQs arrived before an access request RQa but not in time for scrub period P1s to fully overlap the access period P1a of the overlapping access transaction. The sense period P2s is therefore time shifted to align with access period P1a of a subsequent access (or no access if none is requested). A scrub-request evaluation period P1s is shown time shifted in diagrams 700, 705, and 710 but can be completed earlier.

Figure 8:
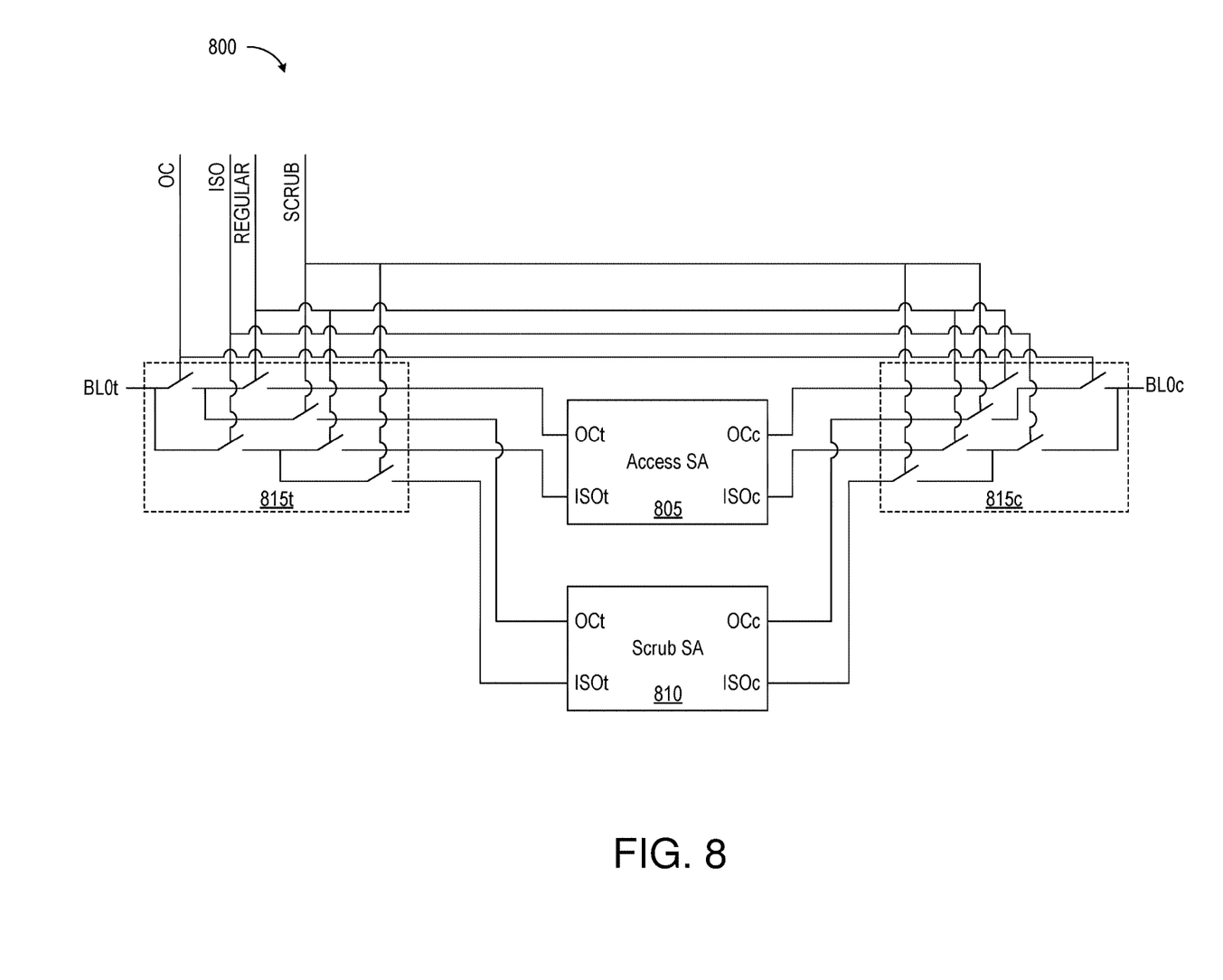
FIG. 8 depicts a sense-amplifier pair 800 in accordance with another embodiment. Bitlines BL0t and BL0c are alternatively connected to an access sense amplifier 805 and a scrub sense amplifier 810 via switch networks 815t and 815c.

FIG. 8 depicts a sense-amplifier pair 800 in accordance with another embodiment. Bitlines BL0t and BL0c are alternatively connected to an access sense amplifier 805 and a scrub sense amplifier 810 via switch networks 815t and 815c. Sense amplifiers 805 and 810 can be similar to sense amplifiers 135a and 135s of FIG. 5 but evaluate control block 515a in sense amplifier 135a and a similar control block in scrub sense amplifier 135s are replaced with switch networks 815t and 815c. Signals OC and ISO control one or the other of sense amplifiers 805 and 810, as detailed previously, in dependence upon which of signals Regular (for regular access) and Scrub is asserted.

The output of the design process for an integrated circuit may include a computer-readable medium, such as, for example, a magnetic tape, encoded with data structures defining the circuitry can be physically instantiated as in integrated circuit. These data structures are commonly written in Caltech Intermediate Format (CIF) or GDSII, a proprietary binary format. Those of skill in the art of mask preparation can develop such data structures from schematic diagrams of the type detailed above.

While the invention has been described with reference to specific embodiments thereof, it will be evident that various modifications and changes may be made thereto without departing from the broader spirit and scope of the invention. Variations of these embodiments will be apparent to those of ordinary skill in the art upon reviewing this disclosure. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory device comprising:
    an array of memory cells, each cell selectively coupled to a bitline, and for each of the bitlines:
        a first sense amplifier coupled to the bitline;
        a second sense amplifier coupled to the bitline; and
        error-correction circuitry coupled to the first sense amplifiers, the error-correction circuitry to:
            read a potentially erroneous bit pattern from the first sense amplifiers;
            correct an error, if any, in the potentially erroneous bit pattern to produce an error-free bit pattern; and write the error-free bit pattern to the first sense amplifiers.

2. The memory device of claim 1, further comprising control circuitry coupled to the first sense amplifiers and the second sense amplifiers, the control circuitry to cause each of the first sense amplifiers to sense a voltage on the bitline, amplify the sensed voltage into a bit of the potentially erroneous bit pattern, and disconnect from the respective bitline.

3. The memory device of claim 2, the control circuitry to further:
control the first sense amplifiers to reconnect to their respective bitlines to charge the respective bitline and memory cell responsive to the error-free bit pattern; and
before the bitlines charge the memory cells;
disconnect the first sense amplifiers from their respective bitlines without having written the error-free bit pattern to the memory cell; and
control the second sense amplifier to connect to the bitline.

4. The memory device of claim 2, the control circuitry further to time operation of the error-correction circuitry.

5. The memory device of claim 4, further comprising a register to receive a scrub-rate variable, and wherein the control circuitry times the operation of the error-correction circuitry responsive to the scrub-rate variable.

6. The memory device of claim 1, further comprising latches to store the potentially erroneous bit pattern.

7. The memory device of claim 1, wherein the error-correction circuitry is coupled to the first sense amplifiers via column logic that selects the potentially erroneous bit pattern from a subset of the bitlines.

8. The memory device of claim 7, wherein the error-correction circuitry is coupled to the second sense amplifiers via the column logic.

9. A method of scrubbing a memory array, the method comprising:
receiving an access request for first data in the memory array;
evaluating the access request over an access-request evaluation period to produce an evaluated access request;
responsive to the evaluated access request, sensing the first data;
generating a scrub request for second data in the memory array;
evaluating the scrub request over a scrub-request evaluation period to produce an evaluated scrub request; and
responsive to the evaluated scrub request, sensing the second data during the access-request evaluation period.

10. The method of claim 9, further comprising delaying the sensing of the second data to align the sensing of the second data with the access-request evaluation period.

11. The method of claim 9, further comprising amplifying the sensed second data while sensing the first data.

12. The method of claim 9, wherein sensing the first data comprising sensing first voltage levels on bitlines and sensing the second data comprises sensing second voltage levels on the bitlines.

13. The method of claim 9, further comprising periodically generating additional scrub requests.

14. The method of claim 13, further comprising receiving a scrub-rate variable specifying a period for generating the additional scrub requests.

15. The method of claim 9, further comprising detecting errors in the second data, correcting the errors, and beginning a write operation to write the error-corrected second data to the memory array.

16. The method of claim 15, further comprising receiving a second access request and interrupting the write operation responsive to the second access request.

17. The method of claim 16, further comprising repeating the write operation.

18. A memory device comprising:
bitlines;
memory cells coupled to respective ones of the bitlines;
scrub sense amplifiers coupled to respective ones of the bitlines;
access sense amplifiers coupled to respective ones of the bitlines; and
a control circuit coupled to the scrub sense amplifiers and the access sense amplifiers, the control circuit to:
manage scrub transactions to the memory cells, the scrub transactions to read bits stored in the memory cells into the scrub sense amplifiers, correct errors in the bits, and write back the corrected bits to the memory cells from the scrub sense amplifiers; and
respond to read requests from a host controller external to the memory device using the access sense amplifiers to sense the bits stored in the memory cells.

19. The memory device of claim 18, further comprising error-correction circuitry coupled to both the scrub sense amplifiers and the access sense amplifiers.

20. The memory device of claim 18, the control circuit to disconnect the scrub sense amplifiers from the bitlines responsive to the read requests.

* * * * *